United States Patent
Ku

(10) Patent No.: US 9,885,377 B2
(45) Date of Patent: Feb. 6, 2018

(54) CONNECTION MEMBER FOR FURNITURE FOOT OF FURNITURE

(71) Applicant: Yao-Nan Ku, Tainan (TW)

(72) Inventor: Yao-Nan Ku, Tainan (TW)

( * ) Notice: Subject to any disclaimer, the term of this patent is extended or adjusted under 35 U.S.C. 154(b) by 0 days.

(21) Appl. No.: 15/439,225

(22) Filed: Feb. 22, 2017

(65) Prior Publication Data

US 2017/0284440 A1 Oct. 5, 2017

(30) Foreign Application Priority Data

Mar. 30, 2016 (TW) .............................. 105204414 U

(51) Int. Cl.
*F16M 11/16* (2006.01)
*F16B 12/44* (2006.01)
*F16B 12/10* (2006.01)

(52) U.S. Cl.
CPC .............. *F16B 12/44* (2013.01); *F16B 12/10* (2013.01); *F16B 2012/106* (2013.01); *F16B 2012/446* (2013.01)

(58) Field of Classification Search
CPC .................................. A47B 13/02; A47B 9/16
See application file for complete search history.

(56) References Cited

U.S. PATENT DOCUMENTS

| 2,809,876 | A | * | 10/1957 | Huff | A47B 13/021 |
| | | | | | 248/188 |
| 7,703,398 | B2 | * | 4/2010 | Brauning | A47B 1/08 |
| | | | | | 108/155 |
| 2006/0096506 | A1 | * | 5/2006 | Brauning | A47B 13/02 |
| | | | | | 108/50.02 |

* cited by examiner

*Primary Examiner* — Amy Sterling
(74) *Attorney, Agent, or Firm* — Winston Hsu

(57) ABSTRACT

A connection member for a furniture foot of furniture is employed to connect a furniture body and a furniture foot together and contains: a base, a holding portion, and a fixing bottom. The holding portion forms on an upper end of the base and is arranged on a coupling face of the furniture body to connect with the furniture body. The fixing bottom forms on a lower end of the base and includes a main joining portion and two tilted portions. The two tilted portions obliquely extend from two peripheral sides of the main joining portion to two peripheral sides of the holding portion, among the two tilted portions and the two peripheral sides of the main joining portion define two first angles, and among the two tilted portions and the two peripheral sides of the holding portion define two second angles.

9 Claims, 6 Drawing Sheets

CONNECTION MEMBER FOR FURNITURE FOOT OF FURNITURE

BACKGROUND OF THE INVENTION

Field of the Invention

The present invention relates to a connection member for a furniture foot of furniture and, more particularly, to the connection member which includes a fixing bottom having a main joining portion and two tilted portions.

Description of the Prior Art

A conventional furniture foot contains four rectangular boards fixed on four sides of a lower surface of furniture. A furniture foot is erected between any two of the four rectangular boards and is located on each of four corners of a furniture body. A connection member and the furniture foot are connected by using an L-shaped angle iron/a trapezoidal block, a wood screw/a metal screw, and a nut.

When the furniture foot is connected with the connection member obliquely, the connection member is cut slantingly, and a fixing orifice is defined on different positions of the furniture foot. A shape of the two of four rectangular boards beside the foot furniture has to correspond to that of the furniture foot, thus causing a complicated production and increasing manufacture cost.

To facilitate shipment, the furniture foot is removed from the connection member. However, such a removal has to apply a wrench or a screwdriver to cause inconvenient disassembly.

The present invention has arisen to mitigate and/or obviate the afore-described disadvantages.

SUMMARY OF THE INVENTION

The primary objective of the present invention is to provide a connection member for a furniture foot of furniture which reduces material cost of two rectangular boards of conventional furniture and which increases using space.

A further objective of the present invention is to provide a connection member for a furniture foot of furniture which contains a fixing bottom having a main joining portion and two tilted portions to simplify a manufacture process.

Another objective of the present invention is to provide a connection member for a furniture foot of furniture which manually connects and removes the furniture foot without using any hand tool to reduce assembly time.

To obtain above-mentioned objectives, a connection member for a furniture foot of furniture provided by the present invention contains: a base, a holding portion, and a fixing bottom.

The holding portion forms on an upper end of the base, and the holding portion is arranged on a coupling face of the furniture body to connect with the furniture body.

The fixing bottom forms on a lower end of the base opposite to the holding portion, and the fixing bottom includes a main joining portion and two tilted portions. The two tilted portions obliquely extend from two peripheral sides of the main joining portion to two peripheral sides of the holding portion, among the two tilted portions and the two peripheral sides of the main joining portion define two first angles, and among the two tilted portions and the two peripheral sides of the holding portion define two second angles. Each of the two tilted portions is arranged on a coupling face of the furniture foot and connect with the furniture foot.

Preferably, the holding portion is parallel to the fixing bottom.

Preferably, each tilted portion includes a receiving hole configured to accommodate a nut so that each tilted portion is in connection with the furniture foot by way of the nut.

Preferably, each tilted portion includes four inclined cutting rims which define each tilted portion, and the receiving hole forms on an intersection area of a central line of two opposite of the four inclined cutting rims and a central line of the other two opposite of the four inclined cutting rims.

Preferably, the two first angles are different.

Preferably, the two first angles are the same.

Preferably, each of the two first angles is within 90 degrees to 180 degrees.

Preferably, each of the two second angles is within 0 degrees to 90 degrees.

DETAILED DESCRIPTION OF THE PREFERRED EMBODIMENTS

The present invention will be clearer from the following description when viewed together with the accompanying drawings, which show, for purpose of illustration only, preferred embodiments in accordance with the present invention.

Figure 1:
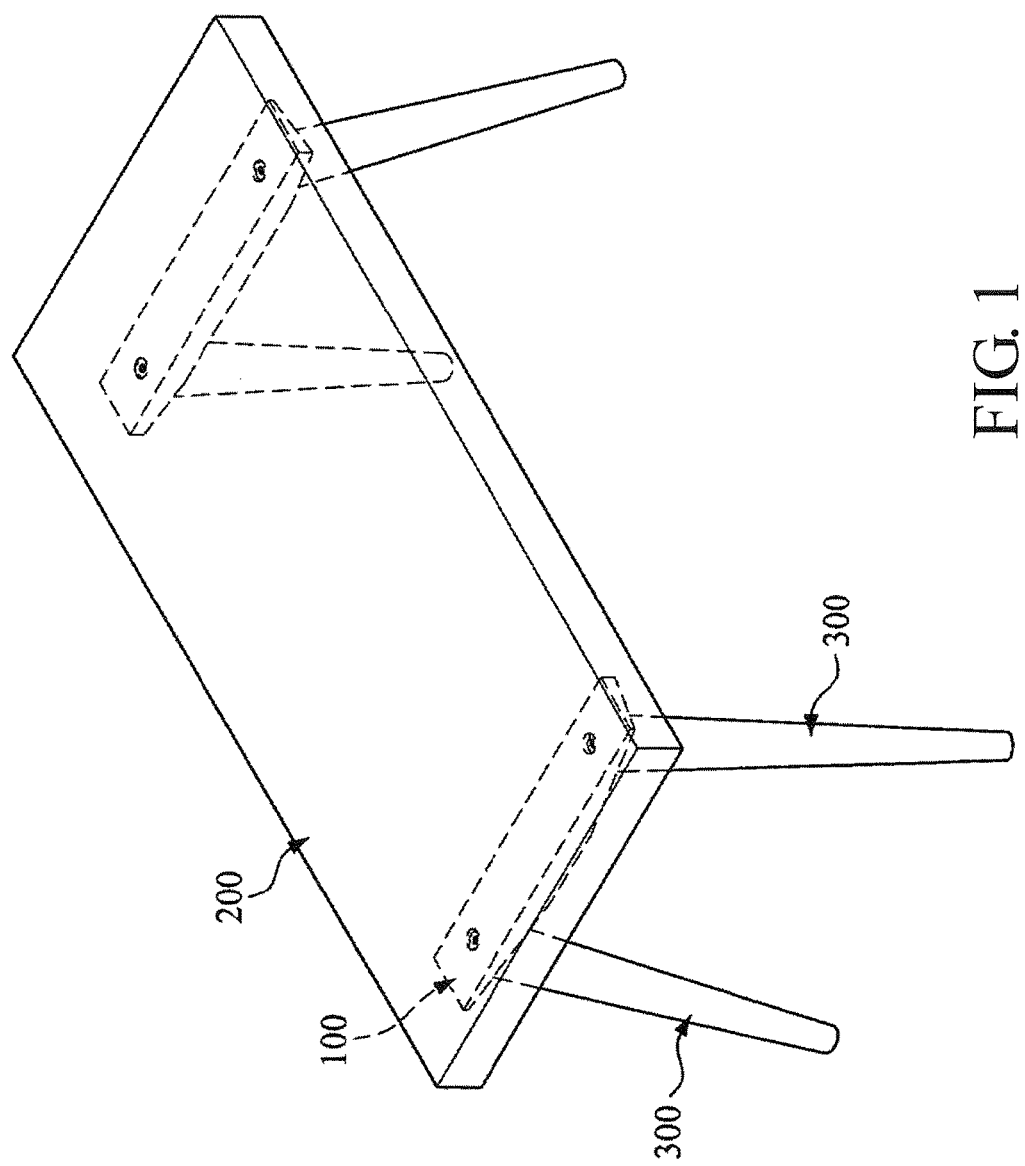
FIG. 1 is a perspective view showing the application of a connection member for a furniture foot of furniture according to a preferred embodiment of the present invention.
Figure 2:
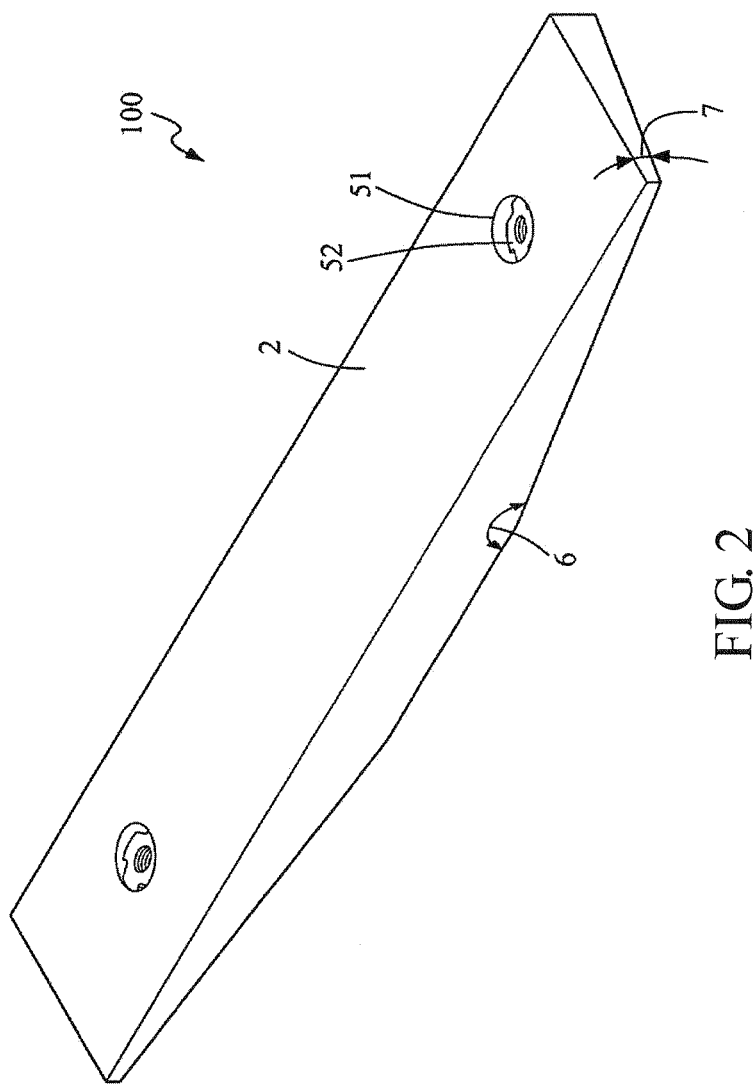
FIG. 2 is a perspective view showing the assembly of the connection member for the furniture foot of the furniture according to the preferred embodiment of the present invention.
Figure 3:
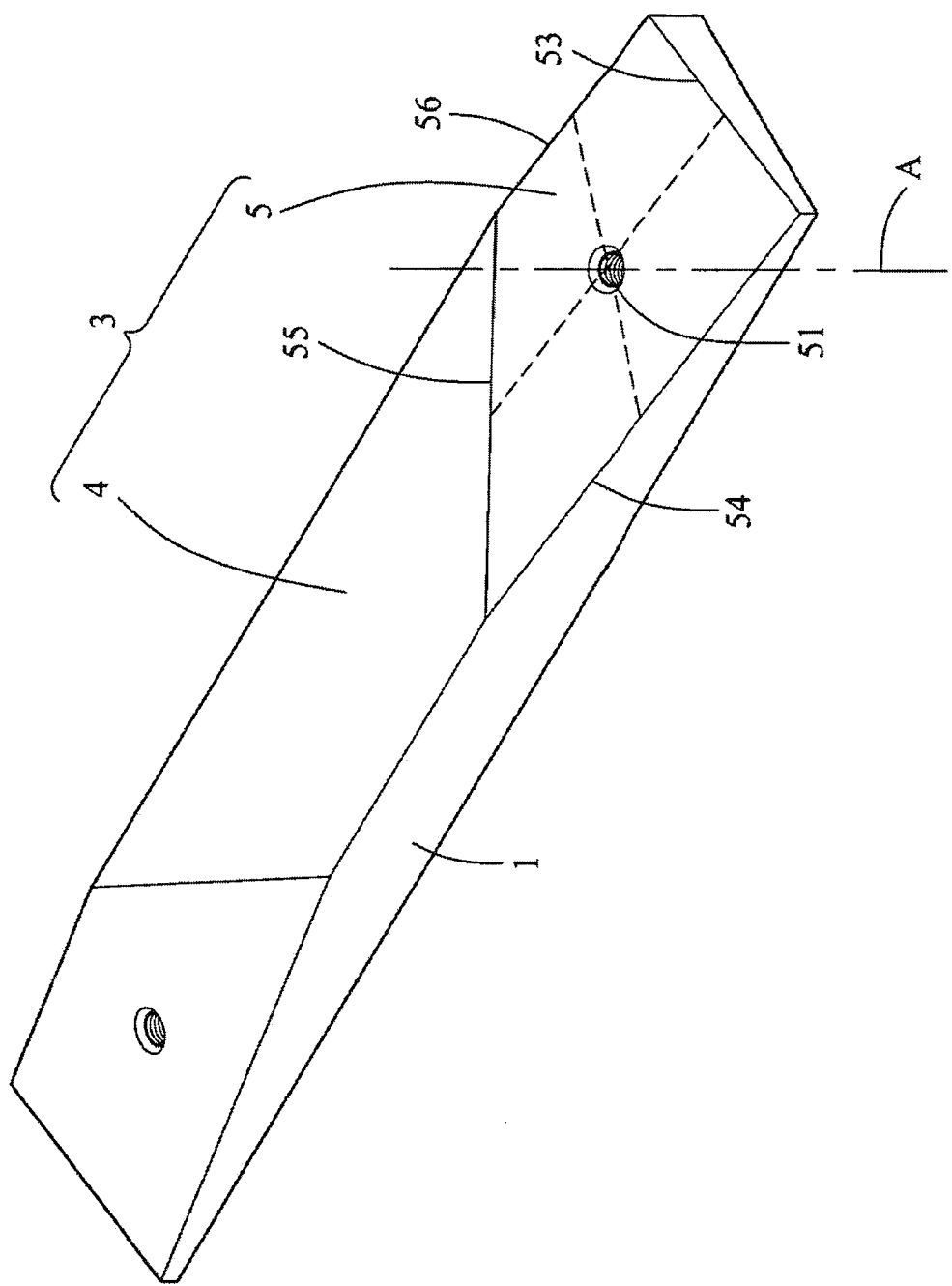
FIG. 3 is another perspective view showing the assembly of the connection member for the furniture foot of the furniture according to the preferred embodiment of the present invention.

With reference to FIG. 1, a connection member 100 for a furniture foot of furniture according to a preferred embodiment of the present invention is employed to connect a furniture body 200 and the furniture foot 300 together. In another embodiment, as illustrated in FIGS. 2 and 3, the connection member 100 comprises a base 1, a holding portion 2, and a fixing bottom 3. The furniture body 200 is a table board, and the furniture is a table. In another embodiment, the furniture is a chair or a cabinet.

Referring to FIG. 2, the holding portion 2 forms on an upper end of the base 1, and the holding portion 2 is arranged on a coupling face of the furniture body 200 to connect with the furniture body 200.

As shown in FIG. 3, the fixing bottom 3 forms on a lower end of the base 1 opposite to the holding portion 2, and the fixing bottom 3 includes a main joining portion 4 and two tilted portions 5. The two tilted portions 5 obliquely extend from two peripheral sides of the main joining portion 4 to two peripheral sides of the holding portion 2. As illustrated in FIG. 2, among the two tilted portions 5 and the two peripheral sides of the main joining portion 4 define two first angles 6, among the two tilted portions 5 and the two peripheral sides of the holding portion 2 define two second angles 7, and each of the two tilted portions 5 is arranged on a coupling face of the furniture foot 300 and connect with the furniture foot 300.

With reference to FIG. 2, in this embodiment, the holding portion 2 is parallel to the fixing bottom 3. In another embodiment, the holding portion 2 is not parallel to the fixing bottom 3.

In this embodiment, each tilted portion 5 includes a receiving hole 51 configured to accommodate a nut 52, so that each tilted portion 5 is in connection with the furniture foot 300 by way of the nut 52.

Each tilted portion 5 is sawn by an electric miter saw, and a cutting shaft of the electric miter saw is adjusted to a desired angle and is moved upwardly and downwardly. The cutting shaft is adjusted based on each of the two first angles 6 and each of the two second angles 7 to saw each tilted portion 5. In another embodiment, each tilted portion 5 is milled by a computer woodworking machine, a chisel or a planer.

With reference to FIG. 3, each tilted portion 5 includes four inclined cutting rims, i.e., a first inclined cutting rim 53, a second inclined cutting rim 54, a third inclined cutting rim 55, and a fourth inclined cutting rim 56. The receiving hole 51 forms on an intersection area of a central line of the first inclined cutting rim 53 and the third inclined cutting rim 55 and a central line of the second inclined cutting rim 54 and the fourth inclined cutting rim 56. In another embodiment, the receiving hole 51 is located at a different position on each tilted portion 5 and is used to support the two furniture feet in balance.

In this embodiment, each of the two second angles 7 is within 0 degree to 90 degrees, and each of the two first angles 6 is within 90 degrees to 180 degrees. The two second angles 7 are the same, and the two first angles 6 are the same. In another embodiment, the two first angles 6 are different.

Figure 4:
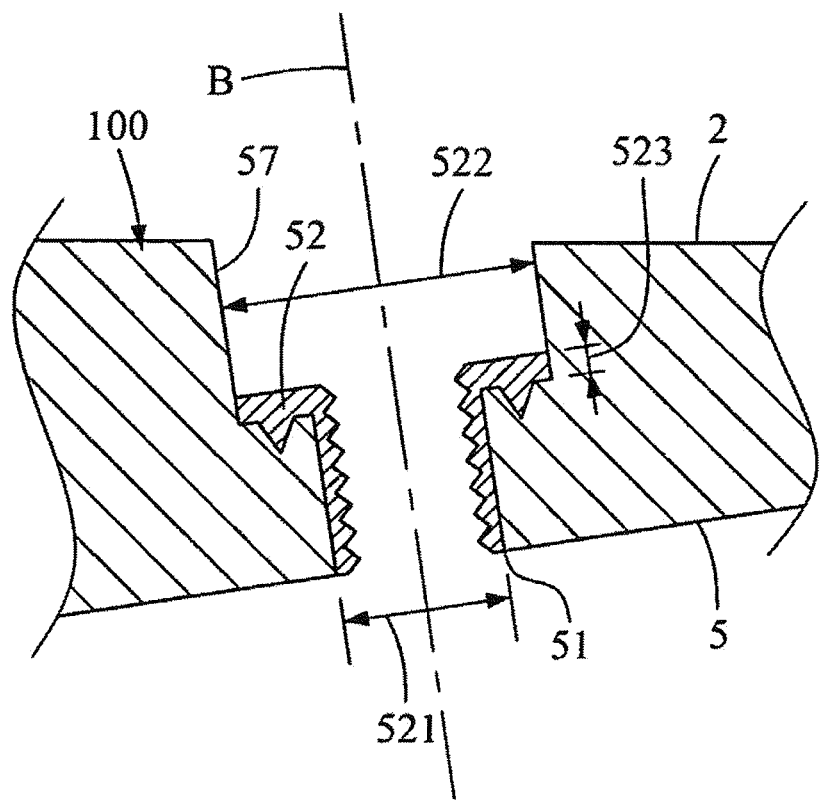
FIG. 4 is a cross sectional view of a receiving hole of the connection member for the furniture foot of the furniture according to the preferred embodiment of the present invention.

Referring to FIG. 4, each tilted portion 5 also includes a recess 57 connecting with the receiving hole 51 and is located adjacent to the holding portion 2 to accommodate the nut 52. In this embodiment, the nut 52 is a polygonal T-shaped nut and has a first outer diameter 521 equal to a first inner diameter of the receiving hole 51 located on each tilted portion 5. A second outer diameter 522 of a head of the nut 52 having an axial thickness 523 is equal to a second inner diameter of the receiving hole 51 located on the holding portion 2. The first outer diameter 521 of the nut 52 is greater than the second outer diameter 522 of the nut 52 so that the nut 52 retains into the receiving hole 51 from the holding portion 2. A central axis B of the nut 52 aligns with a central position of each tilted portion 5 and is perpendicular to each tilted portion 5. In another embodiment, the nut 52 is in other types, such as insert nuts.

Figure 5:
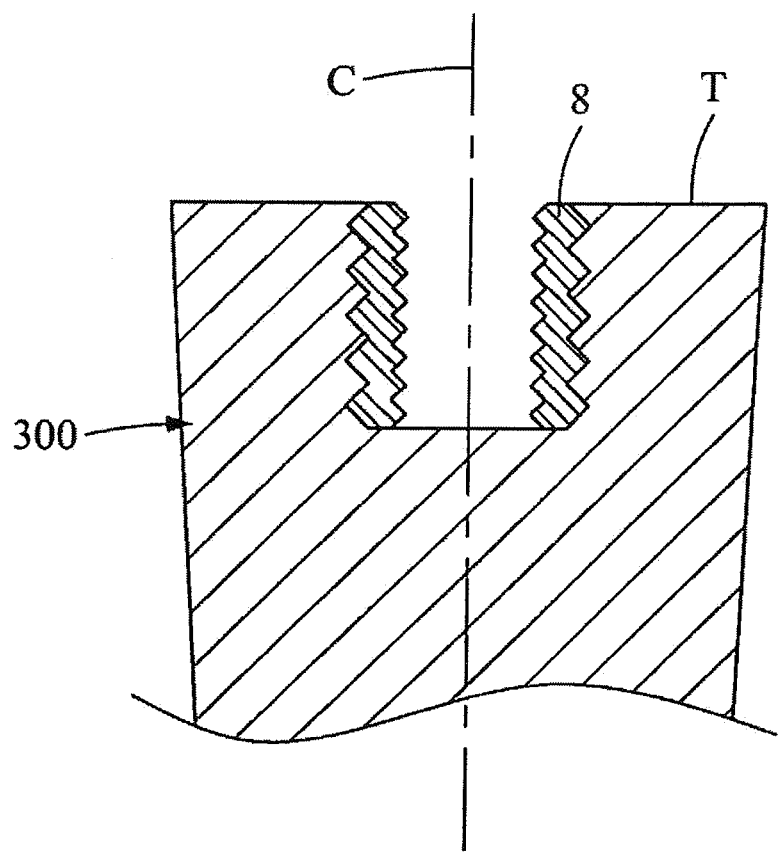
FIG. 5 is a cross sectional view of a furniture foot of the furniture according to the preferred embodiment of the present invention.

As shown in FIG. 5, a central position of a connection face T of the furniture foot 300 retains with an insert nut 8, and a central axis C of the insert nut 8 aligns with the central position of the connection face T and is perpendicular to the connection face T. In another embodiment, the insert nut 8 is in another type, such as having hexagonal internal/external thread nuts.

Figure 6:
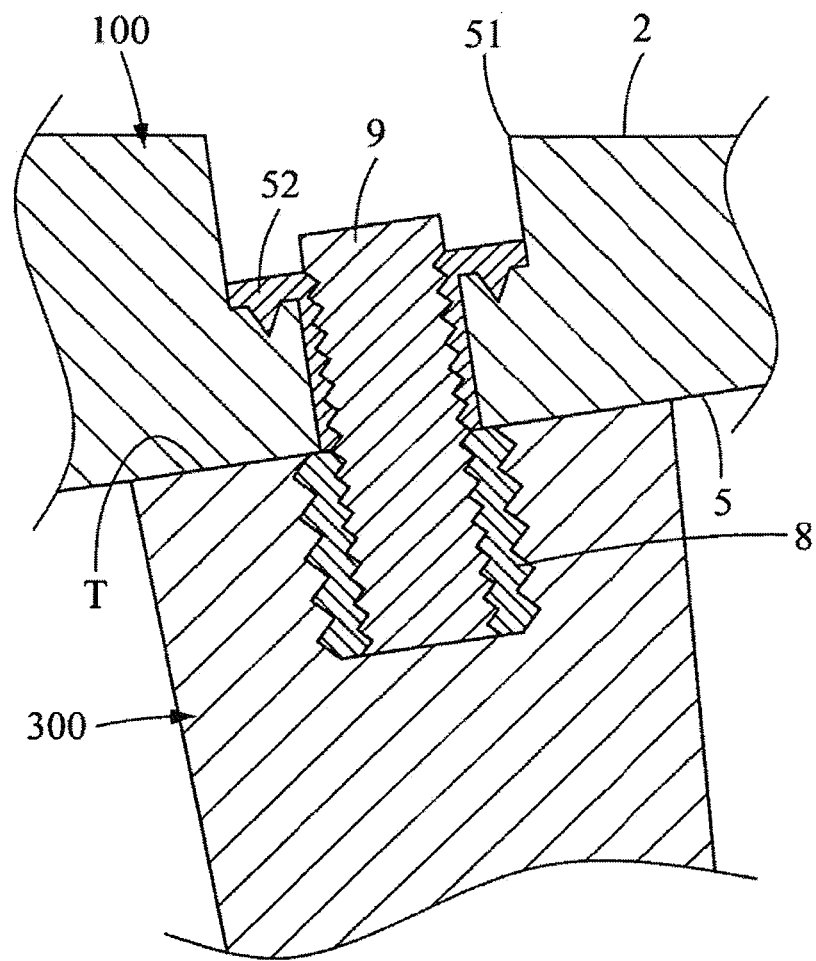
FIG. 6 is a cross sectional view showing the operation of the connection member for the furniture foot of the furniture according to the preferred embodiment of the present invention.

With reference to FIG. 6, the connection member 100 is screwed with the insert nut 8 of the furniture foot 300 by using the nut 52 and a screw bolt 9 having threads arranged on an outer wall of the screw bolt 9 completely. Thereby, the furniture foot 300 is manually connected and removed without using any hand tool. In another embodiment, the screw bolt 9 has two threaded sections individually arranged on the outer wall thereof.

While various embodiments in accordance with the present invention have been shown and described, it is clear to those skilled in the art that further embodiments may be made without departing from the scope of the present invention.

What is claimed is:

1. A connection member for a furniture foot of furniture being employed to connect a furniture body and a furniture foot together and comprising:
   a base;
   a holding portion forming on an upper end of the base, with the holding portion arranged on a coupling face of the furniture body to connect with the furniture body; and
   a fixing bottom forming on a lower end of the base opposite to the holding portion, with the fixing bottom including a main joining portion and two tilted portions, with two peripheral sides of the main joining portion and the two tilted portions extending to and connected with the holding portion, with two peripheral sides of the holding portion extending to and connected with the two tilted portions, with the two peripheral sides of the main joining portion and the tilted portions extending between and connected to the two peripheral sides of the holding portion, with each of the holding portion, the main joining portion, the two tilted portions, the two peripheral sides of the main joining portion and the two tilted portions, and the two peripheral sides of the holding portion being planar, wherein the two tilted portions obliquely extend between the two peripheral sides of the main joining portion and the two tilted portions and obliquely extend from opposite sides of the main joining portion to the two peripheral sides of the holding portion, wherein among each tilted portion and a corresponding peripheral side of the main joining portion and the two tilted portions define a first angle, wherein among each tilted portion and a corresponding peripheral side of the holding portion define a second angle, and wherein each of the two tilted portions is arranged on a coupling face of the furniture foot and connect with the furniture foot.

2. The connection member as claimed in claim 1, wherein the holding portion is parallel to the main joining portion of the fixing bottom.

3. The connection member as claimed in claim 1, wherein each tilted portion includes a receiving hole configured to accommodate a nut, and wherein each tilted portion is in connection with the furniture foot by way of the nut.

4. The connection member as claimed in claim 3, wherein each tilted portion includes first, second, third and fourth inclined cutting rims which define each tilted portion, with the first inclined cutting rim being an interconnection with one of the two peripheral sides of the holding portion, with the second and fourth inclined cutting rims being interconnections with the two peripheral sides of the main joining portion and the two tilted portions, and with the third inclined cutting rim being an interconnection with the main joining portion, with the first and third inclined cutting rims being at an oblique angle to each other, and wherein the receiving hole forms on an intersection area of a central line of the first and third inclined cutting rims and a central line of the second and fourth inclined cutting rims.

5. The connection member as claimed in claim 1, wherein each first is a same angle.

6. The connection member as claimed in claim 3, wherein each second angle is within 90 degrees to 180 degrees.

7. The connection member as claimed in claim 1, wherein each second angle is within 0 degrees to 90 degrees.

8. The connection member as claimed in claim 1, wherein the base is a single solid component.

9. The connection member as claimed in claim 4, wherein the first inclined cutting rim extends at an oblique angle to an interconnection of the one of the two peripheral sides of the holding portion with the holding portion, and wherein the second inclined cutting rim extends at an oblique angle to an interconnection of one of the two peripheral sides of the main joining portion and the two tilted portions with the holding portion.

* * * * *